United States Patent Office 2,944,902
Patented July 12, 1960

2,944,902

SENSITIZATION OF PHOTOGRAPHIC EMULSIONS WITH IONIC POLYALKYLENE OXIDE SALTS

Burt H. Carroll, John Sagal, Jr., and Dorothy J. Beavers, Rochester, N.Y., assignors to Eastman Kodak Company, Rochester, N.Y., a corporation of New Jersey No Drawing. Filed Dec. 10, 1956, Ser. No. 627,135

19 Claims. (Cl. 96—107)

This application relates to photography and particularly to sensitizing photographic emulsions.

It is well known that silver halide emulsions may be chemically sensitized with a variety of materials in order to increase the speed and generally the gamma of the emulsion, as opposed to optical sensitization in which the optical range of sensitivity is increased. Chemical sensitization usually results either from the formation of silver sulfide on the surface of the silver halide crystal, thus increasing sensitivity, or from the formation of small amounts of silver from the reduction of silver halide. Other classes of compounds, such as certain ethylene oxide condensation products and certain cationic surface-active salts increase sensitivity of silver halides without apparently entering into chemical combination with the silver halide.

We have now discovered that silver halide emulsions can be chemically sensitized with ionic (anionic and cationic) polyalkylene oxide salts, such as quaternary ammonium and phosphonium polyalkylene oxide salts, ternary sulphonium polyalkylene oxide salts, polyethylene oxide-bis-carboglutamic acids, etc., and furthermore that the light-sensitivity of the emulsions sensitized with the ionic polyalkylene oxide salts can be appreciably increased if azaindene stabilizing agents are incorporated into the emulsion. That is, while the ionic polyalkylene oxide salts are effective sensitizers and do appreciably increase the sensitivity of silver halide emulsions, their use is accompanied by increase in general fog particularly upon storage of the emulsions under adverse conditions of temperature and humidity. The azaindene stabilizing agents not only stabilize the emulsions against the development of this general fog under adverse conditions of temperature and humidity, but fortunately the azaindenes also increase the light-sensitivity of the emulsions. The azaindenes are unique in respect that no other class of compounds has been found which simultaneously sensitize, as well as stabilize, silver halide emulsions in the presence of the ionic polyalkylene oxide salt sensitizers.

One object of our invention is therefore to provide photographic emulsions sensitized with ionic polyalkylene oxide salts and additionally sensitized and stabilized with azaindenes. Other objects will appear from the following description of our invention.

The objects of our invention are accomplished in part by the incorporation of ionic polyalkylene oxide salts and azaindene compounds into photographic emulsions.

The ionic polyalkylene oxide compounds include cationic materials such as quaternary ammonium and phosphonium polyalkylene oxide salts, and ternary sulfonium polyalkylene oxide salts; and anionic polyalkyelne oxide compounds such as the polyalkylene oxide carboglutamic acid salts, polyalkylene oxide-bis-N-carboxymethyl carbamate salts, polyalkylene oxide-bis-sulfuric acids, etc.

The cationic quaternary and ternary polyalkylene oxide salts used in the emulsions are characterized as containing bivalent polyalkylene oxide radicals such as $-(CH_2CH_2O)_nCH_2CH_2-$ $-(CHCH_2O)_n\overset{|}{C}HCH_2-$
$\phantom{-(}\overset{|}{CH_3}\phantom{CH_2O)_n}\overset{|}{CH_3}$ $-(CH_2CH_2CH_2O)_nCH_2CH_2CH_2-$ or $-(CH_2CH_2CH_2CH_2O)_nCH_2CH_2CH_2CH_2-$ corresponding to polyethylene oxide, polypropylene oxide and polybutylene oxide radicals to which is attached at least one onium salt group such as a quaternary ammonium, phosphonium or ternary sulfonium salt group, and wherein $n$ is a positive integer at least as great as 4 representing the least number of alkylene oxide units present in the polyalkylene oxide radical of the salt.

The cationic quaternary and ternary polyethylene oxide salts are particularly effective as sensitizers for the emulsions and have the structures (A)

$$R_1\overset{R}{\underset{R_2}{\overset{+}{N}}}-(CH_2CH_2O)_nCH_2CH_2-\overset{R}{\underset{R_2}{\overset{+}{N}}}R_1$$
$$X^- \qquad\qquad X^-$$

in which $n$ is greater than 3, X is an anion or acid radical such as halide, alkyl sulfate, p-toluene sulfonate or perchlorate, and R, $R_1$ and $R_2$ are e.g., aliphatic or aromatic radicals such as methyl, ethyl, propyl, benzyl or phenyl.

(B)

$$R_4O-(CH_2CH_2O)_nCH_2CH_2-\overset{R}{\underset{R_2}{\overset{+}{N}}}R_1$$
$$X^-$$

in which X, $n$ R, $R_1$ and $R_2$ are as above mentioned, and $R_4$ is an alkyl or aromatic radical such as methyl, phenyl or p-tert. octylphenyl.

(C)

Structures similar to A and B in which N is replaced by $$-S^+= \text{ or } -P^+\equiv$$

(D)

$$\overset{Q}{\underset{X^-}{\overset{+}{C=N}}}-(CH_2CH_2O)_nCH_2CH_2-\overset{+}{\underset{X^-}{\overset{Q}{N=C}}}$$

in which X and $n$ are as above-mentioned and Q represents the nonmetallic atoms necessary to complete an organic heterocyclic nucleus such as pyridyl, α-picolyl and γ-picolyl.

(E)

$$R_4O-(CH_2CH_2O)_nCH_2CH_2-\overset{+}{\underset{X^-}{\overset{Q}{N=C}}}$$

in which $R_4$, $n$, Q and X are as above.

Representative cationic quaternized and ternarized polyalkylene oxide salts having these formulas are:

(I)

$$\overset{+}{\underset{ClO_4^-}{N}}-(CH_2CH_2O)_4-CH_2CH_2-\overset{+}{\underset{ClO_4^-}{N}}$$

Tetraethoxyethyl-bis-pyridinium perchlorate (II)

$$t-C_8H_{17}-\underset{}{\bigcirc}-O-(CH_2CH_2O)_n-CH_2CH_2-\overset{+}{N}$$
$$OSO_3CH_3^-$$

p-t-Octylphenoxypolyethoxyethylpyridinium methane sulfonate (a derivative of ethylene oxide and p-tert. octylphenol in which $n$ has an average value of 4)

(IIa) Same as II but $n$ has an average value of 6.5.

(IIb) Same as II but $n$ has an average value of 8.5.

(IIc) Same as II but $n$ has an average value of 11.5.

(III)

$$\overset{+}{\underset{ClO_4^-}{N}}-(CH_2CH_2O)_8-CH_2CH_2-\overset{+}{\underset{ClO_4^-}{N}}$$

Octaethoxyethyl-bis-pyridinium perchlorate (IV) 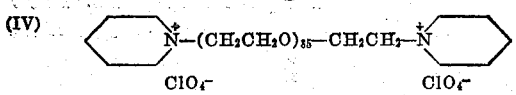

Polyethoxyethyl-bis-pyridinium perchlorate (in which the polyethyleneoxy chain is derived from a polyethylene glycol of average molecular weight 1540)

(V)     $(CH_3)_3N^+—(CH_2CH_2O)_8—CH_2CH_2N^+(CH_3)_3$
            $ClO_4^-$                        $ClO_4^-$

Octaethoxyethyl-bis-trimethylammonium perchlorate (VI) 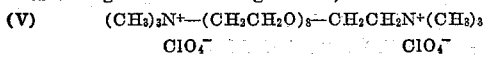

Octaethoxyethyl-bis-dimethyldodecylammonium perchlorate (VII)   $(CH_3)_2S^+—(CH_2CH_2O)_4—CH_2CH_2—S^+(CH_3)_2$
            $ClO_4^-$                        $ClO_4^-$ Tetraethoxyethyl-bis-dimethylsulfonium perchlorate (VIII) 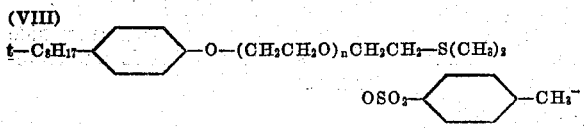

p-t-Octylphenoxypolyethoxyethyldimethylsulfonium-p-toluene sulfonate (in which $n$ has an average value about 4)

(IX) 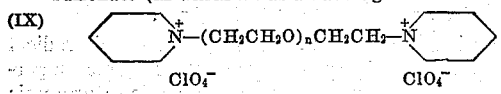

Polyethoxyethyl-bis-pyridinium perchlorate (in which the polyethyleneoxy chain is derived from a polyethylene glycol having a molecular weight of about 300.)

(X) Same as IV but made from a polyethylene oxide of molecular weight of about 600.

(XI) Same as IV but made from a polyethylene oxide of molecular weight of about 1000.

(XIa) 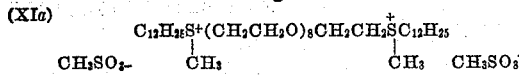

3,6,9,12,15,18,21,24-Octoxahexacosane-1,26-bis(lauryl methyl sulfonium methane sulfonate)

(XIb) 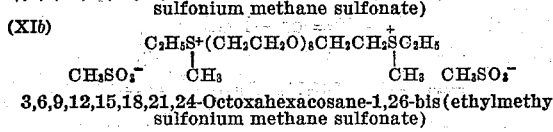

3,6,9,12,15,18,21,24-Octoxahexacosane-1,26-bis(ethylmethyl sulfonium methane sulfonate)

The quaternized polyalkylene oxide monoethers having formulas B and E above are prepared by reaction of the appropriate polyalkylene oxide monoethers such as

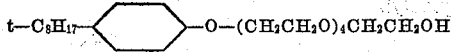

or methoxypolyethylene oxide, with alkylsulfonyl halides such as methanesulfonyl chloride, ethanesulfonyl chloride, p-toluenesulfonyl chloride, followed by quaternization with tertiary bases as pyridine, picolines and trialkylamines such as trimethylamine, dimethylbenzylamine, dimethyllaurylamine, etc.; the resulting quaternary salts may be converted to salts of other anions such as perchlorate in order to facilitate purification.

The bis-quaternary compounds of formulas A and D above are prepared by reaction of polyalkylene oxides of varying molecular weight, with the above-mentioned sulfonyl halides, followed by quaternization as described just above. Thus, polyalkylene oxides such as polyethylene oxides having average molecular weights of the order of about 200 to 1500 or more can be employed to provide the polyalkylene oxide radical of the sensitizers.

The cationic quaternary and ternary polyalkylene oxide sensitizers can be used in the emulsion with useful results in concentrations of the order of from about 0.10 gram to 10 grams per mole of silver halide present in the emulsion.

COMPOUND II

To a solution of 42.6 g. (0.1 mole) of p-tert.-octylphenoxytetraethoxyethanol and 11 g. (0.109 mole) of triethylamine (anhydrous) in dry ethyl ether chilled to 0° C. is added, in portions, 11.5 g. (0.1 mole) of methanesulfonyl chloride. The mixture is shaken thoroughly and allowed to stand at room temperature for 3 days. The triethylamine hydrochloride that separates is removed by filtration. Removal of the ether leaves 50 g. of a clear, colorless liquid.

A mixture of 5.03 g. (0.01 mole) of the above liquid and 0.8 g. (0.01 mole) of pyridine is heated on the steam bath for 18 hours. The resulting liquid which is quite soluble in water is essentially p-tert.-octylphenoxytetraethoxyethylpyridinium methane sulfonate.

Compounds IIa, IIb, and IIc are made by a similar procedure from the corresponding alcohols.

Compounds XV, XVIa, XVIb, XIX, XX and XXI are prepared as described under compounds XII, XIII, XI, XVI, XVII and XVIII, respectively, of the co-filed application of Carroll, Elins, Graham and Wilson.

Additional cationic sensitizers are the following:

*3,6,9,12,15,18,21,24-octoxahexacosane-1,26-bis-(methanesulfonate)*

Nonaethylene glycol, 179 g. (0.45 mole; polyethylene glycol molecular weight 400) was dissolved in 200 ml. of pyridine and the solution cooled to 0°. Methanesulfonyl chloride, 102 g. (0.90 mole) was added slowly to the reaction over a period of two hours while the reaction temperature was not allowed to rise above 5°. After the complete addition of the chloride, the thick slurry was stirred for two hours while warming up to room temperature. The slurry was poured onto ice, acidified with hydrochloric acid (1:1) and the clear solution saturated with salt. The resulting solution (1500 ml.) of "bis-ester" was extracted three times with 300-ml. portions of warm benzene. The benzene was removed on the steam bath under reduced pressure leaving 206 g. (83 percent) of a pale yellow, viscous oil.

*3,6,9,12,15,18,21,24-octoxahexacosane-1,26-bis-(pyridinium methanesulfonate)*

To 266 g. (3.37 mole) of pyridine there was added 472 g. (0.83 mole) of polyethylene glycol ester (just above) and the clear solution heated cautiously on the steam bath for 1.5 hours, keeping the reaction temperature below 95°. (An exothermic reaction occurred above 70° with darkening of the product.) The excess pyridine was removed on the steam bath under vacuum. To remove any pyridine traces, the oil was dissolved in 300 ml. of ethanol and the solvent removed under vacuum on the steam bath as completely as possible leaving 593 g. (98 percent) of a clear, viscous yellow oil.

*3,6,9,12,15,18,21,24-octoxahexacosane-1,26-bis-(pyridinium perchlorate)*

Dry pyridine (250 g.) and 450 g. (0.79 mole) of the polyethylene glycol bis-ester were treated as just described to give the pyridinium methanesulfonate. This oil was dissolved in 500 ml. of absolute ethanol, and added to a solution of 221 g. (1.58 mole) of sodium perchlorate monohydrate in 900 ml. of ethanol. The resulting slurry was heated on the steam bath for one-half hour. The remaining solid was filtered with suction and the sodium methanesulfonate washed well with hot acetone to remove any product adsorbed. The combined filtrates were concentrated on the steam bath under vacuum giving 483 g. (83 percent) of a pale yellow viscous oil, which set to a gel upon cooling.

*3,6,9,12,15,18,21,24-octoxahexacosane-1,26-bis-(trimethyl-ammonium perchlorate) (Compound V)*

Ten grams of the bis-ester of polyethylene glycol 400 and 41.2 g. of 25 percent alcoholic trimethylamine were stirred together for 20 hours. The excess solvent was removed leaving ten grams of 3,6,9,12,15,18,21,24- octoxahexacosane-1,26 - bis(trimethylammonium methanesulfonate) as a pale yellow oil.

The oil was dissolved in 20 ml. methanol and 4.1 g. of sodium perchlorate in 30 ml. of acetone added. The thick slurry was heated for one-half hour, and the sodium methanesulfonate filtered off. The clear solution was concentrated on the steam bath giving a viscous yellow oil.

Other cationic compounds useful in the emulsions are prepared as follows:

*Polypropoxypropyl-α,ω-bis-(pyridinium methane sulfonate)*

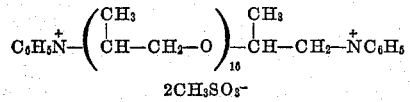

2CH$_3$SO$_3^-$

Dry pyridine, 6.3 g. (0.08 mole) and 23.6 g. (0.02 mole) of polyisopropylene glycol bismethane sulfonate containing about 16 isopropoxy units (prepared as described below) were refluxed together for one and one-half hours. The excess pyridine was removed from the semi-solid by heating on the steam bath under vacuum. Methanol, 25 ml. was added and this solvent removed in a similar manner carrying away traces of pyridine. The remaining thick cream semi-solid weighed 22.2 g. (83% yield).

*Polypropoxypropyl-α,ω-bis-(methane sulfonate)*

To 200 ml. of dry pyridine was added 150 g. of polypropylene glycol containing about 16 isopropoxy units (0.146 mole), and the solution chilled to 0°. Methane sulfonyl chloride, 33.6 g. (0.29 mole) was added at such a rate that the reaction temperature was not allowed to rise above 5°. After stirring the slurry for five and one-half hours at room temperature (allowing the slurry to warm gradually after one hour), the slurry was poured onto ice and acidified with dilute hydrochloric acid. A thick oil rose to the surface and was extracted three times with 200 ml. portions of benzene. The solvent was removed on the steam bath under vacuum yielding 160 g. (93% yield) of a viscous yellow oil which solidified upon cooling.

*Polypropoxypropyl-α,ω-bis(pyridinium methane sulfonate)*

Prepared as described above except using a polyisopropylene glycol containing about 6 isopropoxy units.

The anionic polyalkylene oxide sensitizers are of various types including, e.g., the polyalkylene oxide carboglumatic acid salts, polyalkylene oxide N-carboxymethyl carbamate salts and polyalkylene oxide sulfuric acids. These anionic materials are characterized by containing at least 4 and preferably at least 13 bivalent polyalkylene oxide radicals, such as polyethylene oxide, polypropylene oxide and polybutylene oxide radicals, to which is attached at least one anionic group. The following are representative anionic polyalkylene oxide sensitizers useful in our invention.

(XII)

Na$^+$ $^-$O$\overset{O}{\underset{}{\overset{\|}{C}}}$—CH$_2$NH$\overset{O}{\underset{}{\overset{\|}{C}}}$O(CH$_2$CH$_2$O)$_{75}$CH$_2$CH$_2$O$\overset{O}{\underset{}{\overset{\|}{C}}}$NHCH$_2$$\overset{O}{\underset{}{\overset{\|}{C}}}$O$^-$ Na$^+$ Polyethoxyethyl-bis-N-carboxymethylcarbamate (di Na salt)

(XIII)

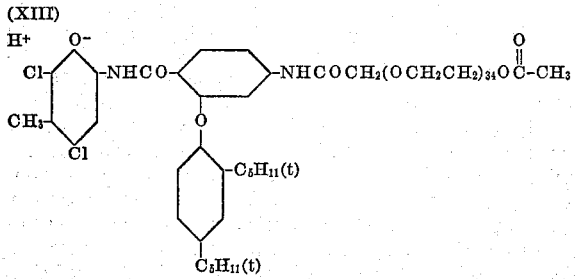

(XIV)   H$^+$$^-$O$_3$S—O(CH$_2$CH$_2$O)$_n$CH$_2$CH$_2$OSO$_3^-$H$^+$

Polyethoxyethyl-bis-sulfuric acid ($n=35$)

(XV)    Same as XIV except $n=75$ (XVI)

Na$^+$ $^-$OOCCHNHCOO(CH$_2$CH$_2$O)$_n$CH$_2$CH$_2$OCONHCHCOO$^-$ Na$^+$
Na$^+$ $^-$OOC(CH$_2$)$_2$ (CH$_2$)$_2$COO$^-$ Na$^+$

Polyethoxyethyl-bis-carboglutamic acid (Na salt)

(XVIa)    $n=35$
(XVIb)    $n=75$ (XVII)

C$_{12}$H$_{25}$O(CH$_2$CH$_2$O)$_{12}$CH$_2$CH$_2$OCONHCH—COO$^-$ Na$^+$
(CH$_2$)$_2$COO$^-$ Na$^+$

N-carbolauroxypolyethoxyethylglutamic acid (Na salt)

(XVIII)

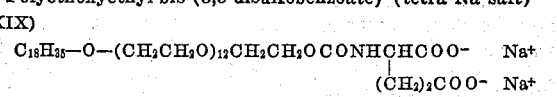

Polyethoxyethyl-bis-(3,5-disulfobenzoate) (tetra Na salt)

(XIX)

C$_{18}$H$_{35}$—O—(CH$_2$CH$_2$O)$_{12}$CH$_2$CH$_2$OCONHCHCOO$^-$ Na$^+$
(CH$_2$)$_2$COO$^-$ Na$^+$

N-carbooleyloxypolyethoxyethyl glutamic acid (Na salt)

(XX)

C$_{16}$H$_{33}$—O—(CH$_2$CH$_2$O)$_{27}$CH$_2$CH$_2$OCONHCH—COO$^-$ Na$^+$
(CH$_2$)$_2$COO$^-$ Na$^+$

N-carbocetyloxypolyethoxyethyl glutamic acid (Na salt)

(XXI)

t-C$_8$H$_{17}$—⟨  ⟩—O(CH$_2$CH$_2$O)$_{30}$CH$_2$CH$_2$OCONHCHCOO$^-$ Na$^+$
CH$_2$CH$_2$COO$^-$ Na$^+$

N-carbo-p-t-octylphenoxypolyethoxyethyl glutamic acid (Na salt)

(XXIa)

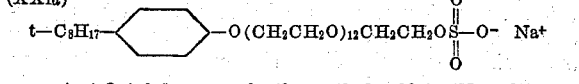

p-tert-Octylphenoxypolyethoxyethyl sulfate (Na salt)

In the above formulas of the cationic and anionic materials the number of alkoxyl groups present is approximate, e.g., in XVIII the molecular weight of the polyethylene oxide intermediate used in making the compound was approximately 1540.

The above anionic materials can be prepared as described in the above-identified invention of Carroll, Elins, Graham and Wilson.

Azaindene compounds which are most efficacious for use in the emulsions together with the ionic polyalkylene oxide compounds are for example, 4-hydroxy-6-alkyl-1,3,3a,7-tetraazaindenes specifically 4-hydroxy-6-methyl-1,3,3a,7-tetraazaindene as well as 5-carboxy-4-hydroxy-1,3,3a,7-tetraazaindene (Reynolds U.S. application Serial No. 520,120, filed July 5, 1955), 1,2-bis(4-hydroxy-6-methyl-1,3,3a,7-tetraazaindene-5-yl)ethane, 1,2,3,4-tetrakis(4-hydroxy - 6 - methyl - 1,3,3a,7 - tetraazaindene - 2 - yl)butane, 2-amino-5-carboxy-4-hydroxy-1,3,3a,7-tetrazaindene, 4 - hydroxy - 2 - β - hydroxyethyl - 6 - methyl - 1,3,3a,7-tetrazaindene, 5-carbethoxy-4-hydroxy-1,3,3a,7-tetrazaindene (Reynolds invention above), 7-hydroxy-1,2,3,4,6-pentazaindene, 4-hydroxy-2-β-hydroxypropyl-6-methyl-1,3,3a,7-tetrazaindene and 4-hydroxy-2-(4-pyridyl)-6-methyl-1,3,3a,7-tetrazaindene.

The azaindenes are used in the emulsions in concentrations of the order of from about 0.02 gram to 10.0 grams per mol of silver halide.

Other azaindene compounds useful for this purpose are disclosed in the examples hereinafter, in U.S. Patents 2,716,062, 2,713,541, and in Allen et al. U.S. Patent 2,735,769, February 21, 1956,
Allen et al. U.S. Patent 2,743,181, April 24, 1956,
Tinker et al. U.S. application Serial No. 515,785, filed June 15, 1955,
Reynolds U.S. Patent 2,756,147, July 24, 1956, Carroll et al. U.S. Patent 2,743,180, April 24, 1956, Zeitschrift fur Wiss. Phot. 47, 2–28 (1952).

However, the speed increases are nevertheless obtained using the ionic polyalkylene oxide compounds in the absence of such antifoggants as attested by the examples hereinafter.

4-hydroxy-6-methyl-1,3,3a,7-tetrazaindene

A mixture of 108.8 kg. (800 moles) aminoguanidine bicarbonate and 44.8 kg. (877 moles) formic acid (90%) was refluxed overnight in a 100-gal. jacketed, glass-lined kettle. The steam pressure was set at 25 p.s.i. In the morning the reaction mixture was diluted with 60 l. hot water and 10.4 kg. (98 moles) anhydrous sodium carbonate was added slowly. The run was heated for three hours at 90–100° and was then concentrated under vacuum until no more water distills over (about 4–5 hr.). The residue was a mush, white solid which is cooled overnight under vacuum. Then 144 kg. glacial acetic acid and 150 kg. (1150 moles) ethyl acetoacetate were added and the mixture was refluxed for three hours. The run was cooled to room temperature and dropped into a 150-gal. stainless steel tank. The liquors were removed by filtration and saved for recovery. The solid was slurried in 30 gal. alcohol, filtered and centrifuged. Washing with fresh portions of alcohol was repeated until no additional color was removed and the odor of acetic acid was at a minimum. The white to pale pink needles were dried on paper trays in a warm air oven. The yield was 98 kg. This is 81.5% of the theoretical quantity—120 kg. The melting point is 285–287°.

7-hydroxy-1,2,3,4,6-pentazaindene

A solution of 50 g. (0.22 moles) of 4,5-diamino-3-hydroxypyrimidine sulfate, J. Am. Chem. Soc. 74, 411 (1952), and 18 g. of sodium nitrite in 300 ml. of 10 percent sodium hydroxide solution was slowly acidified by the addition of acetic acid. The mixture was stirred on the steam bath for 30 minutes and cooled overnight in the refrigerator. The solid was collected on a Büchner funnel and recrystallized from 5 percent hydrochloric acid and then from water to give 30 g. (99%) of the product.

Analysis.—Calcd. for $C_4H_3N_5O$: C=35.0, H=2.2. Found: C=35.0, H=2.7.

2,4-dihydroxy-6-methyl-1,3a,7-triazaindene

To a solution of 18.4 g. (0.8 moles) of sodium in 500 ml. of dry methanol was added 23.4 g. (0.2 moles) of guanidoacetic acid followed by 52 g. (0.4 moles) of ethyl acetoacetate. The mixture was refluxed for 20 hours, concentrated, washed with ether, and taken up in 5 percent hydrochloric acid until the solution had a pH 1 (about 600 ml. of acid). The insoluble material was collected and recrystallized from water to give 5 g. of product melting at 310° C.

1,2-bis-4-hydroxy-6-methyl-1,3,3a,7-tetrazaindene-yl ethane

A mixture of ethyl α,α′-diacetyladipate (29 g.) and 3-amino-1,2,4-triazole (17 g.) in 100 ml. of acetic acid was refluxed 4 hours, cooled, and the solid collected. The solid was digested with 800 ml. of boiling dimethylformamide, filtered hot, and washed with ethanol to yield 20 g. (plus 2 g. from the filtrate) of product melting above 310°.

Analysis.—Calcd. for $C_{14}H_{14}N_8O_2$: C=51.5, H=4.3, N=34.4. Found: C=51.5, H=4.7, N=34.5.

2-amino-5-carboxy-4-hydroxy-1,3,3a,7-tetrazaindene

A mixture of guanazole (25 g.) and diethyl ethoxymethylene malonate (56 g.) in 150 ml. of acetic acid was refluxed 4 hours, cooled and the 2-amino-5-carbethoxy-4-hydroxy-1,3,3a,7-tetrazaindene collected on a Büchner funnel and dried (46.5 g., 83%).

The ester (25 g.) and 250 ml. of 1-N-hydrochloric acid were refluxed 4 hours, cooled, and the solid collected and recrystallized from water to give 9 g. of the acid (M.P. above 300° C.).

Analysis.—Calcd. for $C_6H_5N_5O_3$: C=37, N=2.5, N=35.9. Found: C=37.9, H=2.8, N=35.6.

4-hydroxy-2-β-hydroxypropiohydrazido-6-methylpyrimidine

A mixture of 246 grams of β-hydroxypropiohydrazide (267 moles, 50% excess) (J.A.C.S., 73, 3168), 300 grams of 2-ethylmercapto-4-hydroxy-6-methylpyrmidine (1.77 moles) Ber. 86, 1403), 1 liter of ethanol and 1 liter of water was refluxed 18 hours. Precipitation begins after about 15 hours, continued refluxing for 24 hours longer (total 42 hours). Cooled to 25°, filters 212 grams, 57%, M.P. 223–226°. Recrystallization from water raises the M.P. to 233–234°.

4-hydroxy-2-β-hydroxyethyl-6-methyl-1,3,3a,7-tetrazaindene

Sixty-three grams of hydrazide was refluxed 20 hours in 500 ml. of glacial acetic acid and 50 ml. of concentrated hydrochloric acid. The hot solution was filtered, then cooled, yielding 12 grams of white solid, M.P. 257–260°. A second recrystallization from water yielded 6.5 grams (10%) of pure anhydrous material, M.P. 262–263°.

Analysis.—Calcd.: C, 49.4; H, 5.2; N, 28.9 ($C_8H_{10}N_4O_2$). Found: C, 49.7; H, 4.9; N, 27.2.

1,2,3,4-tetrakis(4-hydroxy-6-methyl-1,3,3a,7-tetrazaindene-2-yl)butane

One hundred ninety-five grams of 1,2,3,4-tetrakis(carbohydrazido)butane (formed by reacting 1,2,3,4-tetracarbomethoxybutane with hydrazine), 340 grams of 2-ethylmercapto-4-hydroxy-6-methylpyrimidine, 100 ml. of glacial acetic acid and 5 liters of water refluxed 24 hours, cooled well, and filtered.

This crude 1,2,3,4-tetrakis(4-hydroxy-6-methyl-2-pyrimidylhydrazino)butane was refluxed with 1 liter of glacial acetic acid, and 50 ml. of concentrated hydrochloric acid for 24 hours, cooled to 0°, and filtered. The solid, recrysallized from water, yielded 39 grams of 6-methyluracil, M.P. 310–315° (infrared spectrum, 6143A identical with that of an authentic sample, 6096A). The combined mother liquors evaporated and recrystallized from water, eventually yielded 18 grams of white solid, M.P. 263–265°; the infrared spectrum of which is different from that of 6-methyluracil and of 2,6-dimethyl-4-methoxy-1,3,3a,7-tetrazaindene. The analytical figures agree fairly well with the tetrahydrate, but suggest slightly incomplete conversion of carboxyl to tetrazaindene moieties.

Analysis.—Calcd.: C, 46.5; H, 4.7; N, 31.0 ($C_{28}H_{26}N_{16}O_4 \cdot 4H_2O$). Found: C, 48.9; H, 5.0; N, 27.5.

The preparation of silver halide emulsions involves three separate operations: (1) the emulsification and digestion or ripening of the silver halide, (2) the freeing of the emulsion from aqueous soluble salts usually by washing, (3) the second digestion or after-ripening to obtain increased sensitivty (Mees, The Theory of the Photographic Process, 1942, page 3). The ionic salt sensitizing agents and azaindenes may be added at any stage, preferably after the final digestion.

The photographic emulsions which we use are of the developing-out type and best results have been obtained with gelatino-silver bromoiodide emulsions. However, emulsions of varying silver halide content may be used.

The emulsions may be chemically sensitized by any of the accepted procedures, in addition to the ionic polyalkylene oxide salts. The emulsions may be digested with naturally active gelatin, or sulfur compounds may be added such as those described in Sheppard U.S. Patents 1,574,944 and 1,623,499, and Sheppard and Brigham U.S. Patent 2,410,689.

The emulsions may also be treated with salts of the noble metals such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli U.S. Patent 2,448,060, and as antifoggants in higher amounts, as described in Trivelli and Smith U.S. Patents 2,566,245 and 2,566,263.

The emulsions may also be chemically sensitized with gold salts as described in Waller and Dodd U.S. Patent 2,399,083 or stabilized with gold salts as described in Damschroder U.S. Patent 2,597,856 and Yutzy and Leermakers U.S. Patent 2,597,915. Suitable compounds are potasisum chloroaurite, potassium aurithiocyanate, potassium chloroaurate, auric trichloride and 2-aurosulfobenzothiazole methochloride.

The emulsions may also be chemically sensitized with reducing agents such as stannous salts (Carroll U.S. patent 2,487,850), polyamines such as diethylene triamine (Lowe and Jones U.S. patent 2,518,698), polyamines such as spermine (Lowe and Allen U.S. patent 2,521,925), or bis-($\beta$-aminoethyl) sulfide and its water-soluble salts (Lowe and Jones U.S. patent 2,521,926).

The emulsions may contain in addition to the cationic polyalkylene oxide salts and azaindenes, salts such as cadmium chloride, cadmium nitrate, cobalt nitrate, manganese chloride, manganese sulfate, zinc chloride, zinc nitrate and zinc sulfate.

The emulsions may further be stabilized to suppress fog by the use of the mercury compounds as described in the Allen et al. U.S. Patent 2,728,663, Carroll et al. U.S. Patent 2,728,664, Leubner et al. U.S. Patent 2,728,665 and Carroll et al. U.S. patent application Serial No. 319,615, filed November 8, 1952.

The chemical sensitizing agents and other addenda which we have described may be used in various kinds of photographic emulsions. In addition to being useful in non-optically sensitized emulsions they may also be used in orthochromatic, panchromatic and X-ray emulsions. They may be added to the emulsion before or after any sensitizing dyes which are used. Various silver salts may be used as the sensitive salt such as silver bromide, silver iodide, silver chloride or mixed silver halides such as silver chlorobromide or silver bromoiodide.

The dispersing agent for the silver halide may be gelatin or other hydrophilic material such as collodion, albumin, cellulose derivatives or synthetic resins.

If desired, the emulsions containing the ionic polyalkylene oxide compounds may also contain the well-known coupler compounds useful in color photography as disclosed in the co-filed Carroll, Elins, Graham and Wilson U.S. patent application Serial No. 627,136. Unexpectedly as shown therein, those emulsions have higher light sensitivity than similar emulsions containing non-ionic polyalkylene oxides and coupler compounds.

The following examples illustrate our invention.

EXAMPLE 1

The improvement in light sensitivity obtained by use of the cationic sensitizers in combination with azaindene compounds is shown by this example.

To an emulsion chemically sensitized with gold and a labile sulfur compound and optically sensitized with a cyanine dye, there was added 4-hydroxy-6-methyl-1,3,3a,7-tetrazaindene in the proportion of 1.5 g. per mole of silver halide. One portion of the emulsion was coated without further addition, as a control. To other portions were added compounds as indicated in Table I, and the different portions were coated on film support, dried, exposed in a sensitometer and processed together, developing 5' in the following developer:

| | | |
|---|---|---|
| Water, about 125° F. (50° C.) | cc | 500 |
| N-methyl-p-aminophenol sulfate | grams | 2.5 |
| Sodium sulfite, desiccated | do | 300 |
| Hydroquinone | do | 2.5 |
| Sodium metaborate | do | 10.0 |
| Potassium bromide | gram | 0.5 |
| Water to make | liter | 1.0 |

Speeds are expressed as 30/E, where E is the exposure in meter-candle-seconds required to produce a density of 0.20 greater than fog.

| Sample | 30/E Speed | Gamma | Fog |
|---|---|---|---|
| Control | 8,050 | 1.12 | .13 |
| Control+polyethylene oxide [1] | 9,250 | 1.13 | .14 |
| Control+1.5 g./mol of silver halide of polyethylene oxide-bis-pyridinium methane sulfonate [2] | 11,700 | 1.02 | .18 |

[1] Unquaternized polyethylene oxide of molecular weight about 1,500.
[2] The polyethylene oxide of average molecular weight 1,540 reacted with methane sulfonic acid and quaternized with pyridine.

EXAMPLE 2

The improvement in light sensitivity obtained by use of different cationic polyalkylene oxide sensitizers in combination with an azaindene stabilizer is shown in this example. The data shows in particular that the improvement in speed over the control sample is maintained after storage under adverse conditions of temperature and humidity.

A negative type of emulsion chemically sensitized with gold and labile sulfur compounds and optically sensitized with a cyanine dye was provided (the control sample in the following table). To samples of this emulsion were added the quantities (grams per mole of silver halide) of the compounds shown in the table. Each sample was coated on a film support, exposed and processed fresh, and after incubation for one week at 120° F. and 50% relative humidity, the processing being carried out as described in Example 1.

| | Fresh Tests | | | Incubation Tests | | |
|---|---|---|---|---|---|---|
| | 30/E Speed | $\gamma$ | Fog | 30/E Speed | $\gamma$ | Fog |
| Control | 6900 | 1.09 | .14 | 5100 | .84 | .27 |
| Octaethoxyethyl-bis-pyridinium perchlorate (III) 0.75 g | 10,400 | 1.16 | .14 | | | 1.98 |
| Polyethoxyethyl-bis-pyridinium perchlorate (IV) 0.75 g | 10,900 | .99 | .15 | | | 1.72 |
| Tetraethoxyethyl-bis-pyridinium perchlorate (I) 0.75 g | 9250 | 1.12 | .14 | | | 1.84 |
| Polyethoxyethyl-bis-pyridinium perchlorate (X) 0.75 g | 11,100 | 1.26 | .14 | | | 2.01 |
| Polyethoxyethyl-bis-pyridinium perchlorate (XI) 0.75 g | 10,600 | 1.14 | .14 | | | 1.70 |
| 4-Hydroxy-6-methyl-1,3,3a,7-tetrazaindene (XXII) 3.0 g | 8650 | 1.05 | .11 | 9050 | .94 | .12 |
| 3.0 g. XXII 0.75 g. III | 10,900 | 1.16 | .14 | 9900 | .88 | .18 |
| 3.0 g. XXII 2.25 g. III | 11,900 | 1.14 | .14 | 7900 | .77 | .30 |
| 3.0 g. XXII 0.75 g. IV | 12,800 | .97 | .16 | 9700 | .72 | .22 |
| 3.0 g. XXII 2.25 g. IV | 14,400 | .92 | .17 | 7700 | .61 | .43 |
| 3.0 g. XXII 0.75 g. I | 9900 | 1.15 | .12 | 10,900 | .94 | .15 |
| 3.0 g. XXII 2.25 g. I | 10,600 | 1.12 | .12 | 9500 | .78 | .18 |
| 3.0 g. XXII 0.75 g. X | 11,100 | 1.08 | .13 | 10,600 | .85 | .19 |
| 3.0 g. XXII 2.25 g. X | 13,400 | 1.09 | .14 | 7200 | .71 | .34 |
| 3.0 g. XXII 0.75 g. XI | 11,400 | 1.09 | .14 | 9500 | .74 | .18 |
| 3.0 g. XXII 2.25 g. XII | 12,200 | 1.09 | .17 | 9050 | .80 | .30 |

EXAMPLE 3

The improvement in light sensitivity obtained by the use of cationic polyalkylene oxides of various molecular weights in combination with an azaindene is shown in this example.

The emulsion described in Example 2 was provided (the control sample in the following table). To samples of this emulsion were added the quantities (grams per mole of silver halide) of the compounds shown in the table. The samples were exposed and processed fresh, and after incubation for 1 week at 120° F. and 50% relative humidity, the processing being carried out as in Example 1.

|  | Fresh Tests | | | Incubation Tests | | |
|---|---|---|---|---|---|---|
|  | 30/E Speed | γ | Fog | Speed | γ | Fog |
| Control | 5400 | 1.17 | .14 | 4250 | .91 | .34 |
| Octaethoxyethylbis - trimethylammonium perchlorate (V) .75 g | 6150 | 1.19 | .14 | 3450 | .97 | .40 |
| Octaethoxyethyl - bis - dimethyl dodecylammonium perchlorate (VI) .75 g | 4750 | .87 | .51 | ------ | ------ | 1.84 |
| p - t - Octylphenoxytetraethoxyethyl pyridinium methane sulfonate (II) 0.75 g | 2450 | .85 | .36 | ------ | ------ | 1.90 |
| p - t - Octylphenoxypolyethoxyethyl pyridinium methane sulfonate IIa 0.75 g | 4450 | 1.07 | .29 | ------ | ------ | 1.90 |
| p - t - Octylphenoxypolyethoxyethyl pyridinium methane sulfonate IIb 0.75 g | 5450 | 1.11 | .20 | ------ | ------ | 1.63 |
| p - t - Octylphenoxypolyethoxyethyl pyridinium methane sulfonate IIc 0.75 g | 6400 | 1.19 | .17 | ------ | ------ | 1.16 |
| 3.0 g. XXII + .75 g. V | 7200 | 1.21 | .16 | 7700 | 1.09 | .17 |
| 3.0 g. XXII + 2.25 g. V | 7550 | 1.03 | .17 | 8450 | 1.04 | .17 |
| 3.0 g. XXII + .75 g. VI | 9900 | .95 | .32 | ------ | ------ | 1.64 |
| 4 - Hydroxy - 6 - methyl - 1, 3,3a,7 - tetrazaindene (XXII) 3 g | 6700 | 1.08 | .15 | 6400 | 1.05 | .19 |
| 3.0 g. XXII + .75 g. II | 9900 | .88 | .15 | ------ | ------ | .89 |
| 3.0 g. XXII + .75 g. IIa | 9900 | 1.03 | .20 | 3850 | .97 | .44 |
| 3.0 g. XXII + .75 g. IIb | 9500 | 1.08 | .19 | 5350 | .97 | .33 |
| 3.0 g. XXII + .75 g. IIc | 9700 | 1.10 | .19 | 6550 | 10.3 | .24 |
| 3.0 g. XXII + 2.25 g. IIc | 10,900 | 1.16 | .23 | 5350 | .84 | .61 |

EXAMPLE 4

The advantageous use of the azaindenes in combination with the cationic polyalkylene oxide salts is further illustrated by the following emulsions whose sensitometric characteristics are shown in the table following.

A negative-speed gelatino-silver bromoiodide emulsion adjusted to optimum sensitivity with a mixture of a labile sulfur compound and a soluble gold salt was divided into several portions. To each portion was added, at 40° C., an equal amount of an optical sensitizing dye sensitizing the emulsions in the region 5000–6000 A. One portion was retained as a control and the quantities of the compounds indicated in the following table were added to the other portions. The emulsions were coated on a film support as previously described. Each coating was exposed 1/25 second on an intensity scale sensitometer, then developed 5 min. at 68° F. in the developer of Example 1. After incubation for 1 week at 120° F. and 50% R. H. the coatings were exposed and processed in a similar manner.

| Sample | g./mol AgX | Fresh Tests | | | 1 Week at 120° F. | | |
|---|---|---|---|---|---|---|---|
|  |  | 30/E Speed | γ | Fog | 30/E Speed | γ | Fog |
| Control | ------ | 5450 | 1.22 | .14 | 2800 | .88 | .54 |
| Compound IV [1] | 2.25 | 9050 | .98 | .20 | ------ | ------ | 2.00 |
| Compound IV [1] | 2.25 | ------ | ------ | ------ | ------ | ------ | ------ |
| 1,2-Bis(4-hydroxy-6-methyl-1,3,3a,7-tetrazaindene-5-yl)ethane | .75 | 8850 | .92 | .18 | 5600 | .58 | .50 |
| Compound IV [1] | 2.25 | ------ | ------ | ------ | ------ | ------ | ------ |

| Sample | g./mol AgX | Fresh Tests | | | 1 Week at 120° F. | | |
|---|---|---|---|---|---|---|---|
|  |  | 30/E Speed | γ | Fog | 30/E Speed | γ | Fog |
| 2-Amino-5-carboxy-4-hydroxy-1,3,3a,7-tetrazaindene | 3.0 | 9700 | .97 | .21 | ------ | ------ | .93 |
| Compound IV [1] | 2.25 | ------ | ------ | ------ | ------ | ------ | ------ |
| 1,2,3,4-Tetrakis-(4-hydroxy-6-methyl-1,3,3a,7-tetrazaindene-2-yl) butane | 3.0 | 5700 | 1.10 | .14 | 6150 | 1.08 | .15 |
| Compound IV [1] | 2.25 | ------ | ------ | ------ | ------ | ------ | ------ |
| 5-Carbethoxy-4-hydroxy-2-methyl-1,3,3a,7-tetrazaindene | 3.0 | 9050 | .90 | .21 | ------ | ------ | .86 |
| Compound IV [1] | 2.25 | ------ | ------ | ------ | ------ | ------ | ------ |
| 4-Hydroxy-2-β-hydroxyethyl-6-methyl-1,3,3a,7-tetrazaindene | 3.0 | 10,600 | .96 | .21 | 10,600 | .83 | .23 |
| Compound IV [1] | 2.25 | ------ | ------ | ------ | ------ | ------ | ------ |
| 5-Carbethoxy-4-hydroxy-1,3,3a,7-tetrazaindene | 3.0 | 11,700 | .98 | .20 | 9900 | .66 | .53 |

[1] Polyethoxyethyl-bis-pyridinium perchlorate derived from polyethylene glycol of average molecular weight of about 1540.

The effectiveness of the anionic polyalkylene oxide compounds as sensitizers, alone or in conjunction with the azaindenes is illustrated in the following examples (5 to 11) all utilizing as the control emulsion, to which the indicated amounts of compounds per mol silver halide are added, a fast bromoiodide emulsion chemically sensitized with sulfur and gold compounds, processed at 68° F. as described in Example 1. The speed values in the example are expressed as 100 (1–log E) where "E" is the exposure in meter candle seconds required to produce in the film a density of 0.3 above fog.

EXAMPLE 5

| | g./mol | Fresh Tests | | | 1 Week 120° | | |
|---|---|---|---|---|---|---|---|
|  |  | Speed | γ | Fog | Speed | γ | Fog |
| Control | ------ | 308 | 1.22 | .16 | ------ | ------ | ------ |
| Polyethoxyethyl-α,ω-bis-N-carboxymethyl-carbamate XII | 3.0 | 329 | .98 | .19 | ------ | ------ | ------ |

EXAMPLE 6

| | g./mol | Fresh Tests | | | 1 Week 120° | | |
|---|---|---|---|---|---|---|---|
|  |  | Speed | γ | Fog | Speed | γ | Fog |
| Control | ------ | 311 | 1.33 | .18 | 293 | 1.04 | .22 |
| Polyethoxyethyl-α,ω-bis-sulfuric acid XIV | .75 | 311 | 1.85 | .18 | 291 | .93 | .33 |
| XIV | 3.0 | 326 | 1.29 | .18 | ------ | ------ | .72 |
| Polyethoxyethyl-α,ω-bis-sulfuric acid XV | .75 | 333 | 1.10 | .20 | 297 | .69 | .49 |
| XV | 3.0 | 338 | 1.10 | .22 | ------ | ------ | 1.12 |

EXAMPLE 7

| | g./mol | Fresh Tests | | | 1 Week 120° | | |
|---|---|---|---|---|---|---|---|
|  |  | Speed | γ | Fog | Speed | γ | Fog |
| Control | ------ | 306 | 1.26 | .16 | 286 | 1.09 | .19 |
| Polyethoxyethyl-bis-carboglutamic acid (sodium salt) XVIa | .75 | 314 | 1.16 | .16 | 303 | .99 | .28 |
| XVIa | 2.25 | 322 | 1.16 | .17 | ------ | ------ | .74 |
| XVIa | 4.5 | 325 | 1.14 | .17 | ------ | ------ | 1.12 |
| N-Carbolauroxy-polyethoxyglutamic acid (sodium salt) XVII | .75 | 304 | 1.19 | .14 | 295 | .95 | .18 |
| XVII | 2.25 | 307 | 1.17 | .14 | 295 | 1.02 | .18 |
| XVII | 4.5 | 300 | 1.22 | .14 | 293 | .92 | .20 |
| 4-Hydroxy-6-methyl-1,3,3a,7-tetrazaindene XXII | 3.0 | 314 | 1.17 | .13 | 317 | 1.05 | .13 |
| XXII 3.0 g./mol + XVIa 2.25 g./mol | ------ | 327 | 1.20 | .16 | 328 | 1.01 | .18 |
| XXII 3.0 g./mol + XVII 2.25 g./mol | ------ | 317 | 1.21 | .13 | 321 | 1.13 | .16 |

EXAMPLE 8

|  | g./mol | Fresh Tests ||| 1 Week 120° |||
|---|---|---|---|---|---|---|---|
|  |  | Speed | γ | Fog | Speed | γ | Fog |
| Control | | 311 | 1.16 | .19 | 295 | 1.05 | .23 |
| p-tert. Octylphenoxypolyethoxyethyl sulfate XXIa | .75 | 316 | 1.28 | .21 | 301 | 1.16 | .27 |
| XXIa | 2.25 | 321 | 1.18 | .20 | 301 | .92 | .34 |
| XXIa | 4.5 | 319 | 1.16 | .18 | 306 | .96 | .29 |
| 4-Hydroxy-6-methyl-1,3,3a,7-tetrazaindene (XXII) | 3.0 | 318 | 1.10 | .18 | 317 | 1.07 | .15 |
| XXII 3.0 g./mol + XXIa 2.25 g./mol | | 329 | 1.02 | .19 | 324 | .86 | .16 |

EXAMPLE 9

|  | g./mol | Speed | γ | Fog | Speed | γ | Fog |
|---|---|---|---|---|---|---|---|
| Control | | 307 | 1.00 | .15 | 298 | .94 | .26 |
| Polyethoxyethyl-α,ω-bis-sulfuric acid (XIV) | .75 | 317 | 1.12 | .18 | missing | | |
| XIV | 3.0 | 321 | 1.19 | .18 | | | 1.00 |
| Polyethoxyethyl-bis-(3,5-disulfobenzoate) (tetra sodium salt) XVIII | .75 | 314 | 1.10 | .19 | 303 | .95 | .37 |
| XVIII | 3.0 | 327 | 1.09 | .22 | | | 1.26 |
| Polyethoxyethyl-α,ω-bis-sulfuric acid (XV) | .75 | 327 | 1.05 | .22 | 307 | .86 | .51 |
| XV | 3.0 | 326 | 1.04 | .22 | | | .93 |
| Polyethoxyethyl-bis-carboglutamic acid (sodium salt) XVIb | .75 | 328 | .95 | .19 | 299 | .68 | .47 |
| XVIb | 3.0 | 327 | 1.05 | .22 | | | 1.05 |

EXAMPLE 10

|  | g./mol | Speed | γ | Fog | Speed | γ | Fog |
|---|---|---|---|---|---|---|---|
| Control | | 317 | 1.08 | .10 | 308 | .98 | .17 |
| Polyethoxyethyl-bis-carboglutamic acid (sodium salt) XVIa | .75 | 322 | 1.04 | .09 | 307 | .88 | .24 |
| XVIa | 3.0 | 326 | 1.04 | .09 | 306 | .73 | .40 |
| N-Carbocetyloxy-polyethoxy glutamic acid (sodium salt) XX | .75 | 336 | .93 | .10 | 322 | .73 | .25 |
| XX | 3.0 | 330 | 1.00 | .11 | 325 | .85 | .26 |
| N-Carbooleyloxy-polyethoxy glutamic acid (sodium salt) XIX | .75 | 334 | 1.03 | .11 | 325 | .82 | .24 |
| XIX | 3.0 | 337 | 1.13 | .10 | 329 | .90 | .26 |
| N-Carbo-p-t-octyl phenoxypolyethoxy glutamic acid (sodium salt) XXI | .75 | 330 | .98 | .10 | 320 | .82 | .24 |
| XXI | 3.0 | 329 | 1.01 | .12 | 323 | .75 | .30 |
| 4-Hydroxy-6-methyl-1,3,3a,7-tetrazaindene XXII | 3.0 | 326 | 1.15 | .11 | 308 | 1.01 | .12 |
| XXII 3.0 g./mol + XVIa 3.0 g./mol | | 336 | 1.05 | .12 | 329 | .82 | .12 |
| XXII 3.0 g./mol + XX 3.0 g./mol | | 341 | 1.15 | .13 | 334 | .99 | .13 |
| XXII 3.0 g./mol + XIX 3.0 g./mol | | 340 | 1.02 | .11 | 326 | .80 | .15 |
| XXII 3.0 g./mol + XXI 3.0 g./mol | | 340 | 1.02 | .12 | 329 | .88 | .12 |

EXAMPLE 11

|  | g./mol | Speed | γ | Fog | Speed | γ | Fog |
|---|---|---|---|---|---|---|---|
| Control | | 316 | 1.21 | .15 | 308 | 1.00 | .19 |
| 4-Hydroxy-6-methyl-1,3,3a,7-tetrazaindene XXII | 3.0 | 320 | 1.24 | .13 | 315 | 1.11 | .13 |
| Bis(2-amino-5-iodo-pyridine hydroiodide) mercuric iodide XXIII | 3×10⁻⁴ | 302 | 1.29 | .09 | 302 | 1.07 | .07 |
| 1,2-Bis(4-hydroxy-6-methyl-1,3,3a,7-tetrazainden-5-yl)ethane XXIV | .75 | 309 | .94 | .12 | 302 | .86 | .11 |
| Cadmium chloride (XXV) | 10 | 320 | 1.23 | .09 | 315 | 1.05 | .10 |
| Polyethoxyethyl-bis-carboglutamic acid (sodium salt) XVIb | .75 | 337 | 1.05 | .17 | 335 | .91 | .27 |

EXAMPLE 11—Continued

|  | g./mol | Speed | γ | Fog | Speed | γ | Fog |
|---|---|---|---|---|---|---|---|
| XVIb .75 g./mol + XXII 3.0 g./mol | | 341 | 1.07 | .17 | 340 | 1.03 | .17 |
| XVIb .75 g./mol + XXIII 3×10⁻⁴ g./mol | | 335 | 1.05 | .14 | 335 | .89 | .20 |
| XVIb .75 g./mol + XXIV .75 g./mol | | 334 | 1.12 | .14 | 330 | .97 | .17 |
| XVIb .75 g./mol + XXV 10 g./mol | | 336 | 1.10 | .12 | 336 | .94 | .18 |
| Polyethoxyethyl-α,ω-bis-sulfuric acid XV | .75 | 341 | 1.13 | .15 | 336 | .88 | .30 |
| XV .75 g./mol + XVII 3.0 g./mol | | 342 | 1.09 | .17 | 344 | 1.05 | .18 |
| XV .75 g./mol + XXIII 3×10⁻⁴ | | 331 | 1.14 | .14 | 336 | .96 | .21 |
| XV .75 g./mol + XXIV .75 g./mol | | 334 | 1.04 | .13 | 334 | .98 | .16 |
| XV .75 g./mol + XXV 10 g./mol | | 334 | 1.05 | .10 | 337 | .95 | .17 |

EXAMPLE 12

A fast negative gelatin-silver halide emulsion sensitized with gold and sulfur compounds and optically sensitized with a cyanine dye was treated with the ternary sulfonium and azaindene materials shown below, and coated on a cellulose acetate support, exposed in a sensitometer and processed as described in Example 1 with the following results:

|  | Fresh Tests ||| 1 Week 120° |||
|---|---|---|---|---|---|---|
|  | Speed | γ | Fog | Speed | γ | Fog |
| Control | 318 | 1.37 | .17 | 325 | 1.09 | .20 |
| 3,6,9,12,15,18,21,24 - Octoxahexacosane - 1,26 - bis (lauryl - methylsulfonium methane sulfonate) XIa 0.09 g./mol AgX | 314 | 1.24 | .20 | | | 1.28 |
| XIa 0.3 g./mol | | | 1.06 | | | black |
| XIa 0.75 g./mol | | | 2.06 | | | black |
| 3,6,9,12,15,18,21,24 - Octoxacosane - 1,26 - bis (ethyl-methylsulfonium methane sulfonate XIb 0.09 g./mol | 319 | 1.40 | .19 | 325 | 1.15 | .26 |
| XIb 0.3 g./mol | 326 | 1.46 | .23 | 324 | 1.17 | .36 |
| XIb 0.75 g./mol | 323 | 1.47 | .20 | 313 | 1.07 | .53 |
| 4-Hydroxy-6-methyl-1,3,3a,7-tetrazaindene XXII, 3.0 g./mol | 324 | 1.30 | .15 | 341 | 1.32 | .17 |
| XXII 3.0 g./mol + XIa 0.09 g./mol | 332 | 1.49 | .16 | 336 | 1.16 | .17 |
| XXII 3.0 g./mol + XI 0.3 g./mol | 336 | 1.32 | .20 | 322 | .96 | .32 |
| XXII 3.0 g./mol + XIa 0.75 g./mol | 344 | 1.04 | .40 | | | black |
| XXII 3.0 g./mol + XIb 0.09 g./mol | 326 | 1.37 | .16 | 338 | 1.22 | .14 |
| XXII 3.0 g./mol + XIb 0.3 g./mol | 329 | 1.42 | .16 | 336 | 1.21 | .15 |
| XXII 3.0 g./mol + XIb 0.75 g./mol | 328 | 1.39 | .17 | 342 | 1.02 | .14 |

It will be understood that we contemplate as included within our invention all modifications and equivalents falling within the scope of the appended claims.

What we claim is:

1. A light-sensitive photographic silver halide emulsion containing an azaindene stabilizing agent of the class consisting of hydroxy and amino triazaindenes, tetrazaindenes and pentazaindenes, and a sensitizing agent of the class consisting of (1) a compound having the general formula

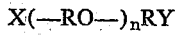

$$X(-RO-)_nRY$$

wherein $n$ represents a positive integer greater than 3, R represents an alkylene group of from 2 to 4 carbon atoms, X and Y represent the same radical containing a group of the class consisting of quaternary ammonium, ternary sulfonium, carboxyl, sulfonic acid and sulfuric acid groups, and (2) a compound having said formula wherein X represents a member of the class consisting of alkyloxy and alkylphenoxy groups and Y represents said radical.

2. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms and X and Y represent the same radical containing a quaternary ammonium group.

3. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms and X and Y represent the same radical containing a trialkylammonium group.

4. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms and X and Y represent the same radical containing a pyridinium group.

5. A light sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms and X and Y represent the same radical containing a carboxyl group.

6. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms and X and Y represent carboglutamic acid groups.

7. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms and X and Y represent sulfonic acid groups.

8. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms, X represents an alkylphenoxy group and Y represents a pyridinium group.

9. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms, X represents an alkylphenoxy group and Y represents a trialkylammonium group.

10. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms, X represents an alkyloxy group of from 2 to 4 carbon atoms, X represents an alkyloxy group and Y represents a radial containing a carboxyl group.

11. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms, X represents an alkyloxy group and Y represents a carboglutamic acid group.

12. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms, X represents an alkylphenoxy group and Y represents a radical containing a carboxyl group.

13. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms, X represents an alkylphenoxy group and Y represents a carboglutamic acid group.

14. A light-sensitive photographic silver halide emulsion containing a hydroxytetrazaindene stabilizing agent and a sensitizing agent having the general formula $$X(-RO-)_nRY$$

wherein $n$ represents a positive integer greater than 3, R represents an alkylene group of from 2 to 4 carbon atoms, X represents an alkylphenoxy group and Y represents a radical containing a sulfuric acid group.

15. A light-sensitive photographic silver halide emulsion containing a hydroxytetrazindene stabilizing agent and a quaternary ammonium polyethylene oxide salt sensitizing agent.

16. A light-sensitive photographic silver halide emulsion containing a hydroxytetrazaindene stabilizing agent and a bis-pyridinium polyethylene oxide salt sensitizing agent.

17. A light-sensitizing photographic emulsion containing 4-hydroxy-6-methyl-1,3,3a,7-tetrazaindene and a bis-pyridinium polyethylene oxide sensitizing agent.

18. A light-sensitive photographic silver halide emulsion containing a hydroxytetrazaindene stabilizing agent and a polyethylene oxide carboglutamic acid sensitizing agent.

19. A light-sensitive photographic silver halide emulsion containing a hydroxytetrazaindene stabilizing agent and a polyethylene oxide bis-carboglutamic acid sensitizing agent.

References Cited in the file of this patent

UNITED STATES PATENTS

| | | |
|---|---|---|
| 2,288,226 | Carroll et al. | June 30, 1942 |
| 2,716,062 | Carroll et al. | Aug. 23, 1955 |
| 2,784,090 | Carroll | Mar. 5, 1957 |
| 2,784,091 | Carroll et al. | Mar. 5, 1957 |
| 2,823,123 | Knox et al. | Feb. 11, 1958 |

FOREIGN PATENTS

| | | |
|---|---|---|
| 556,458 | Great Britain | Oct. 6, 1943 |
| 558,710 | Great Britain | Jan. 18, 1944 |

UNITED STATES PATENT OFFICE
CERTIFICATE OF CORRECTION

Patent No. 2,944,902                  July 12, 1960

Burt H. Carroll et al.

It is hereby certified that error appears in the printed specification of the above numbered patent requiring correction and that the said Letters Patent should read as corrected below.

Column 9, line 20, for "potasisum" read -- potassium --; column 10, line 6, for "300" read -- 30.0 --; line 74, in the table, first column thereof, for "2.25 g. XII" read -- 2.25 g. XI --; column 11, line 43, in the table, sixth column thereof, for "10.3" read -- 1.03 --; column 14, line 49, in the table, first column thereof, for "XI" read -- XIa --.

Signed and sealed this 4th day of April 1961.

(SEAL)

Attest:    ERNEST W. SWIDER

~~KARL H. AXLINE~~
Attesting Officer

ARTHUR W. CROCKER
Acting Commissioner of Patents